Feb. 10, 1942.   R. M. OSTERMANN   2,272,679
RAIL VEHICLE WITH MECHANICALLY DRIVEN SWIVEL TRUCK
Filed July 8, 1939   6 Sheets-Sheet 4
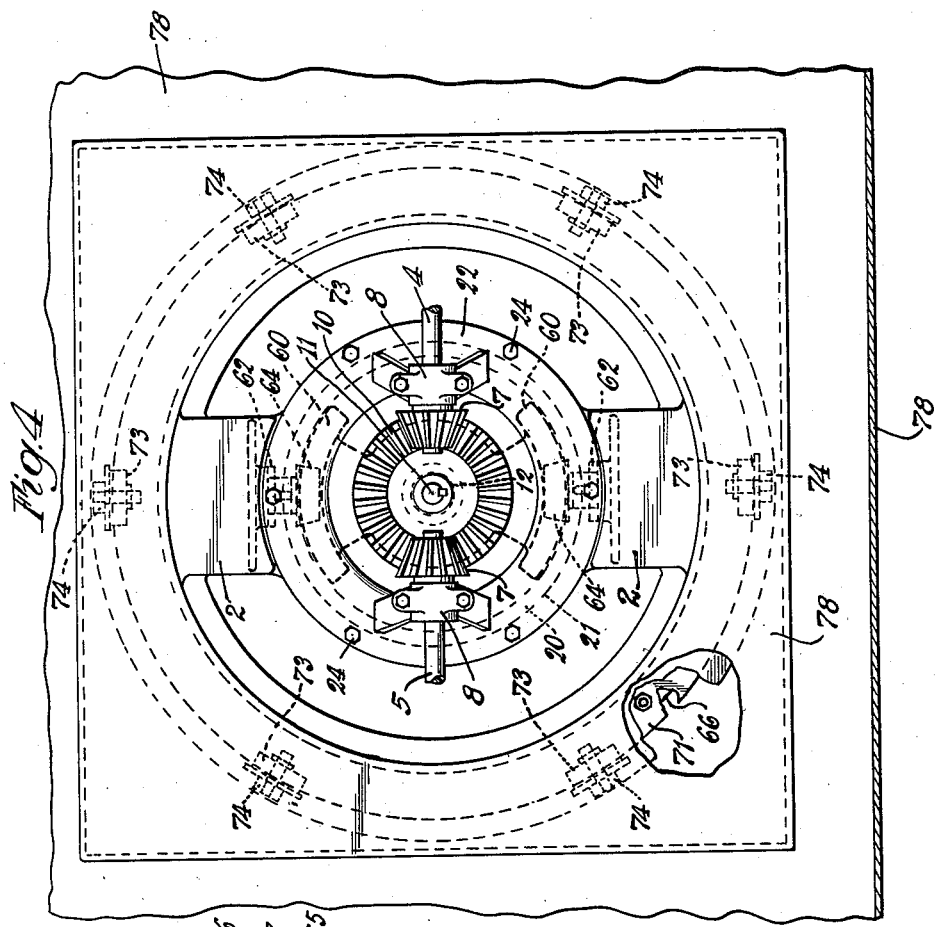
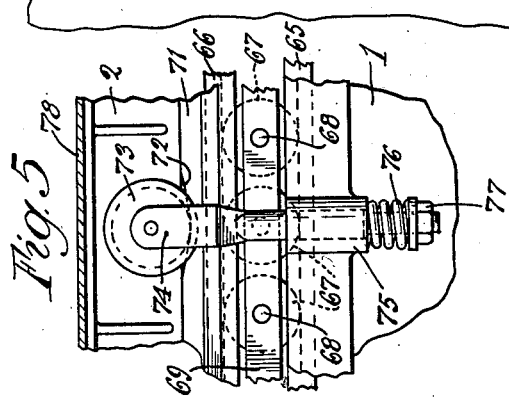
INVENTOR.
Rudolf M. Ostermann
BY Parker + Carter
ATTORNEYS.

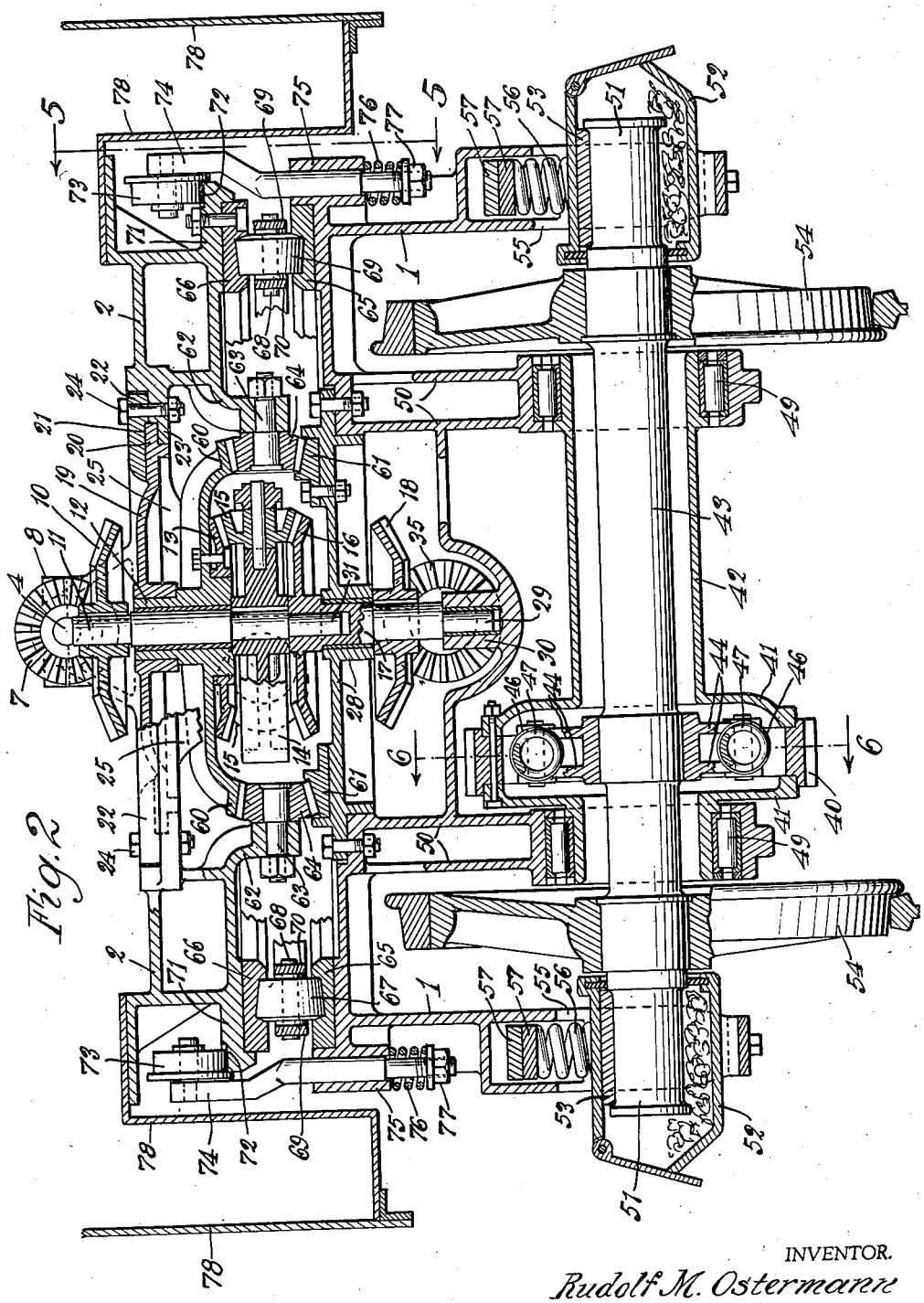

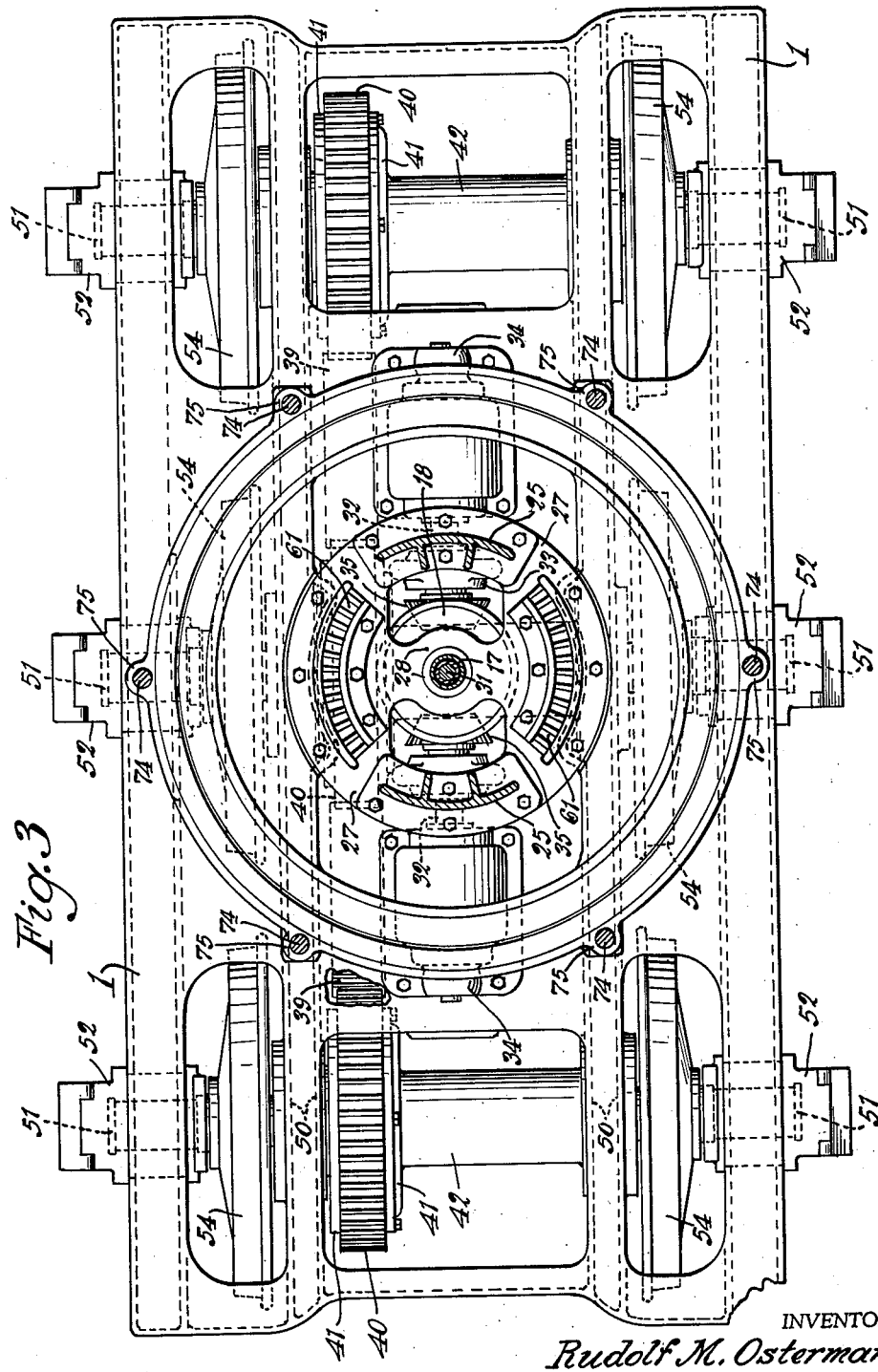

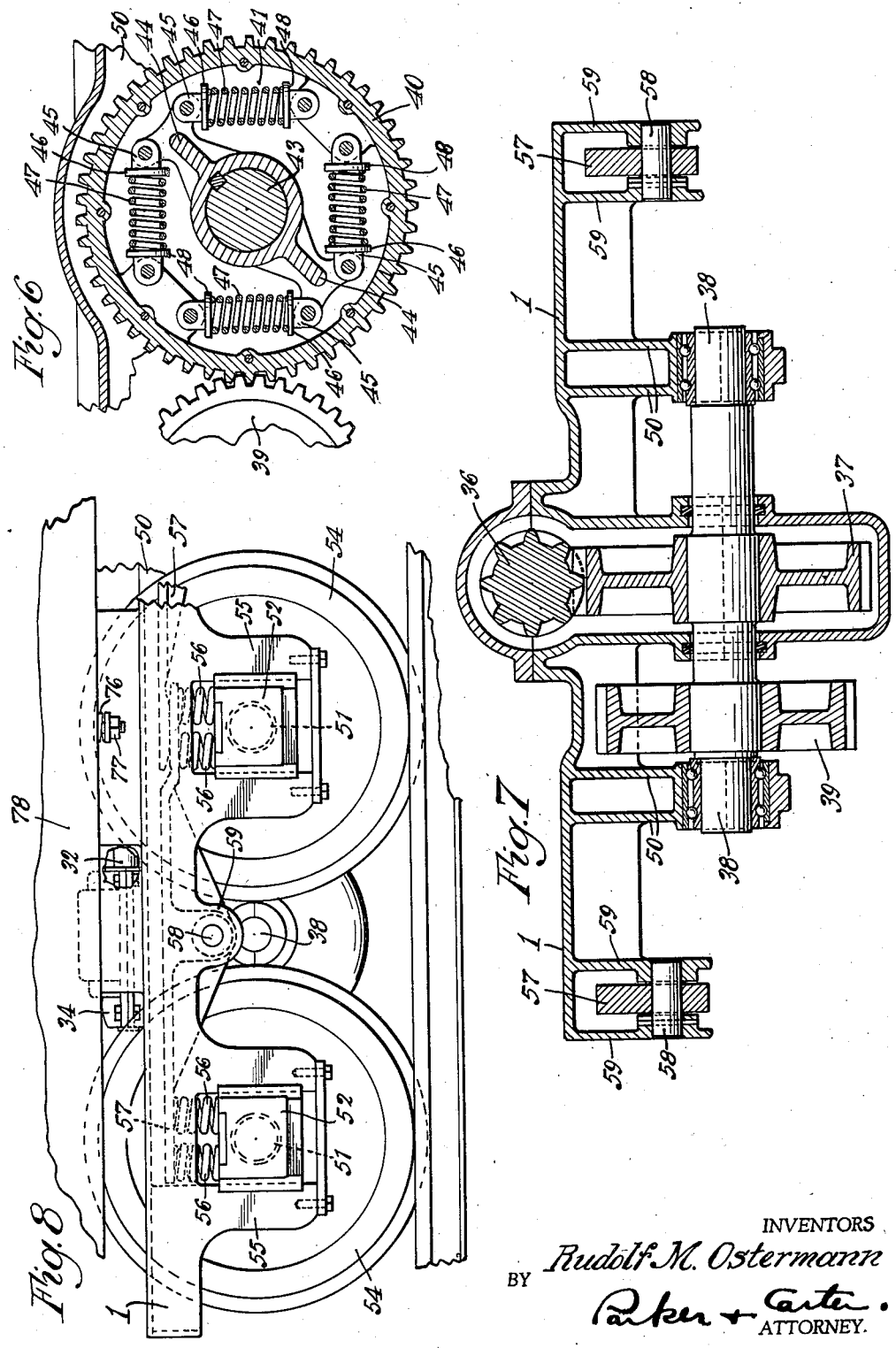

Feb. 10, 1942.   R. M. OSTERMANN   2,272,679
RAIL VEHICLE WITH MECHANICALLY DRIVEN SWIVEL TRUCK
Filed July 8, 1939   6 Sheets-Sheet 6
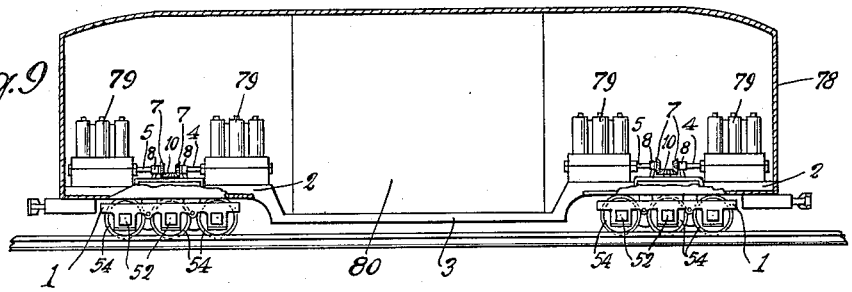
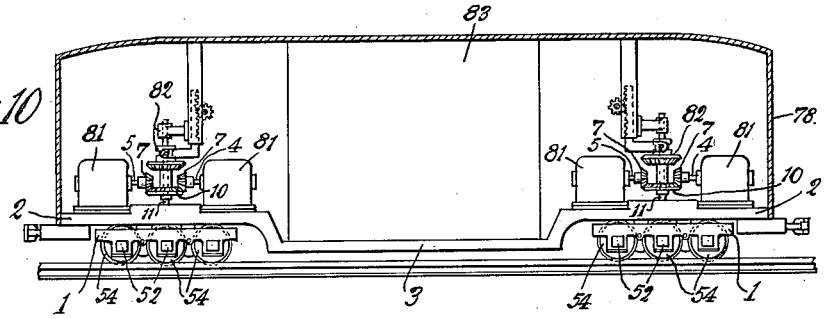
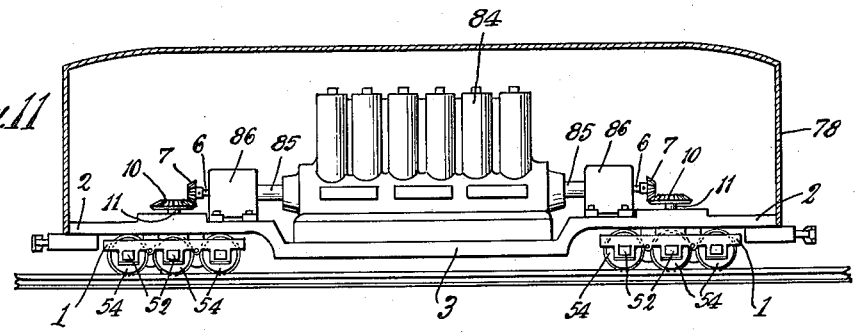
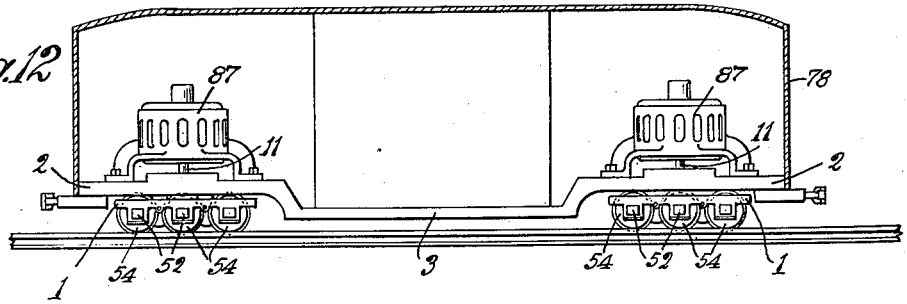
INVENTOR.
Rudolf M. Ostermann
BY Parker + Carter
ATTORNEYS.

Patented Feb. 10, 1942

2,272,679

UNITED STATES PATENT OFFICE 2,272,679

RAIL VEHICLE WITH MECHANICALLY DRIVEN SWIVEL TRUCK

Rudolf M. Ostermann, Kenilworth, Ill.

Application July 8, 1939, Serial No. 283,437

8 Claims. (Cl. 105—117)

This invention relates to a mechanical drive for the transmission of power. One of the most important applications of the invention is in connection with locomotives or mechanically driven rail vehicles generally. Although it might be applied to vehicles not running on rails, it is illustrated herewith as applied to a power driven rail vehicle car or locomotive.

One object of the invention is to provide means for transmitting the driving power of a vehicle to the wheels. Another object is to provide means in connection with a vehicle having swiveling trucks for transmitting power to the wheels of the trucks. Another object is to provide means for transmitting power through the swivel point of such a swivel truck to the wheels. Many other objects will appear from time to time throughout the specification and the claims.

In connection with power driven rail cars and locomotives in which swivel trucks are necessarily provided to permit the vehicle to pass around curves, the problem of economically transmitting power to the wheels and of doing this particularly where large powers are involved is difficult. It is further complicated by the necessity of anchoring the propelling engine rigidly on a frame or other support when the wheels which are to be driven are carried on swiveling trucks which move with relation to the frame or support for the driving engine. An important purpose of the invention is to provide a structure in which all of the wheels are drivers in order to utilize all of the car or locomotive weight for traction purposes.

The objects enumerated and many others are accomplished in the device illustrated in the drawings and described below.

The invention is illustrated more or less diagrammatically in the accompanying drawings, wherein:

Figure 2 is a transverse, vertical section taken at line 2—2 of Figure 1 on an enlarged scale;

Figure 3 is a horizontal section taken at line 3—3 of Figure 1 with parts in plan and parts in section;

Figure 4 is a plan view of Figure 1 with parts omitted;

Figure 5 is a sectional elevation with parts in section taken at line 5—5 of Figure 2;

Figure 6 is a longitudinal, vertical, cross sectional detail taken at line 6—6 of Figure 2;

Figure 7 is a transverse, vertical, sectional detail taken on an enlarged scale at line 7—7 of Figure 1;

Figure 8 is a detail showing in elevation two of the wheels of the truck and showing, also, the equalizers;

Figure 9 is a diagrammatic elevation with parts in section showing a car or locomotive driven by high speed steam engines;

Figure 10 is a similar view showing a car or locomotive driven by compound turbines;

Figure 11 is a similar view showing a Diesel engine arranged to drive the car or locomotive; and Figure 12 is a similar view showing an electrical locomotive arranged with two vertical motors.

Like parts are designated by like characters throughout the specification and the drawings.

Figure 1:
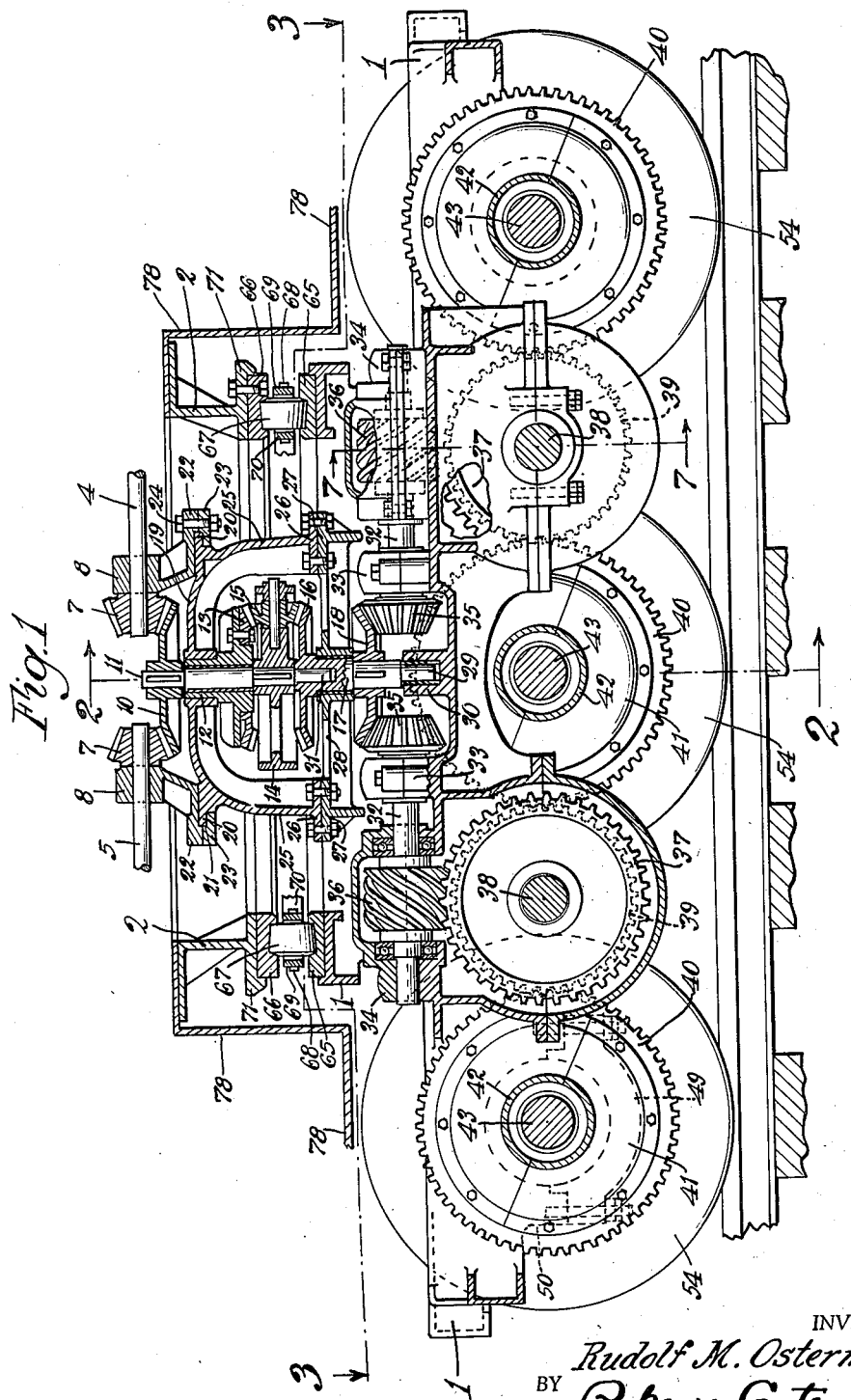
Figure 1 is a longitudinal, vertical section taken on the center line of a swiveling truck.

In general, the mechanism comprises a combination of two swiveling trucks secured to a locomotive or a vehicle frame upon which is mounted a driving mechanism. A drive is provided which passes through the swiveling point and by means of which power is carried from the engine or other power source and transmitted to the wheels of the truck. There is a connection between each truck and the vehicle frame which permits rotation in a single plane and prevents it in any other plane. The connection between the truck and vehicle frame is, thus, in no sense a universal joint. Although the device is shown with two trucks, more than two might be used and because the trucks will ordinarily be identical only one will be explained in detail.

As shown in Figures 1 and 2, a truck frame 1 is provided. The invention is not limited to any particular truck frame details and they might be widely varied without departing from the spirit of the invention. A vehicle or locomotive frame 2 is preferably provided and, as shown particularly in Figures 9 to 12, inclusive, this frame may be downwardly bent as at 3 to provide a well. Whatever the design of the truck and vehicle frames in detail, there will be at least one driving truck. Preferably, all trucks will drive but, where desired, only one will drive and the others will serve merely as load carrying trucks.

As shown in Figures 1 and 2 in particular, two generally horizontal shafts 4 and 5 may be used to drive the truck wheels. These may be driven, for example, by the high-speed steam engines shown in Figure 9 or by the turbines of Figure 10 or otherwise. It might be possible to use only a single driving shaft 6, as shown, for example, in Figure 11. Whether one or more shafts 4, 5 or 6 be used, each will carry at its inner end a beveled pinion 7. The shafts are preferably carried in bearings 8, 8. In the particular form shown, they are bolted or otherwise secured to the main vehicle frame 2. The beveled pinions 7 mesh with a beveled gear 10 keyed on a main driving shaft 11 upon which is mounted the hub 12 of a differential reaction gear 13. Keyed also on the shaft 11 is a driving disk 14 which has rotatably mounted in it a plurality of beveled pinions 15. The pinions 15 mesh with the differential reaction gear 13 and, also, with a differentially driven gear 16. The differentially driven gear 16 is provided with an extension hub 17 upon which is keyed the main driving beveled gear 18.

The differential gearing members are enclosed within a bearing housing 19 which swivels with the truck and is provided adjacent its upper end with a circular flange 20 which is embraced, as shown in Figure 1, within a groove 21 formed between the members 22 and 23 which may be bolted together by bolts 24. The circular flange 20 centers itself adjustably within the circular groove 21 which is formed as a part of the main frame. The bearing housing 19 is provided with two webbed pedestals 25, 25 ending in feet 26 which are bolted to corresponding surfaces 27 on a bearing supporting member 28 which furnishes a bearing for the hub 17 of the differentially driven gear 16. The bearing housing 19 and the bearing support 28 are both secured to and centered in the truck frame 1.

The extension 17 of the hub of the differentially driven gear 16 is reduced as at 29 and received in a bearing 30 which is secured to or formed as a part of the truck frame 1. The main drive shaft 11 is reduced as at 31 and terminates, as shown in Figure 1 in particular, in a suitable bearing formed in the hub of the differentially driven gear 16.

Mounted on the truck frame are two driving shafts 32, 32. They are carried in suitable bearings 33 and 34 and each carries at its inner end a beveled pinion 35 which meshes with the main driving gear 18. Each, also, carries a worm 36 enclosed within a suitable housing.

Each of the worms 36 meshes with a worm gear 37 on a shaft 38. Each shaft 38 carries a gear 39 and each gear 39 meshes with a gear 40 which is mounted on an enlargement 41 of the quill 42 about one of the axles 43. To each axle 43 is secured one or more pairs of ears 44. Between each pair of ears are rotatably mounted abutments 45 provided with enlargements 46 upon which springs 47 are seated. At their opposite ends, each of the springs 47 bears against an abutment or shoulder 48 pivoted upon a part of the gear 40. By the means just described, a flexible driving connection between the gears 40 and the shafts 43 is provided.

Each of the quills is received in anti-friction bearings 49 which are carried on extensions 50 from the truck frame 1. At their outer ends, the axles 43 terminate in trunnions 51 which are surrounded by journal boxes 52 and bearings 53. Wheels 54 are mounted upon the axles 43 and the journal boxes 52 are received, as shown particularly in Figures 2 and 8, in extensions or guides 55 formed as a part of the truck frame 1. One or more springs 56 bears upon the upper end of the journal box and at its upper end, each spring contacts one arm or end of an equalizer lever 57. Each equalizer lever is pivoted upon a pin 58 mounted within members 59 which form a part of the truck frame 1. The equalizer levers may overlap each other as shown at the right of Figure 8.

In addition to the differential gearing above described, there are provided as extensions from or additions to the differential reaction gear 13 a pair of oppositely placed gear segment portions 60 and, correspondingly, there are provided beneath these gear segment portions, other gear segment portions 61 which are secured to the truck frame 1. Depending downwardly from any suitable portion of the vehicle frame 2 are arms 62, 62 which serve as bearings and supports for shafts 63 upon each of which is mounted a beveled pinion 6, these pinions meshing with the gear segments 60 and 61. A turn table track 65 is secured upon any suitabale portion of the truck frame and a corresponding turn table track 66 is mounted upon the vehicle frame so that the two turn table tracks are positioned one above the other concentrically. As shown, the turn table tracks have bearing and retaining grooves in them. The grooves are relatively deep and provided with shoulders against which the end faces of the turn table rollers 67 may be engaged. While the rollers may be mounted in any manner, they are in the particular form here shown mounted on short shafts 68 which are themselves secured in outer and inner rings 69 and 70, respectively.

The vehicle frame is formed to provide or may have attached to it a ring-like member 71. At suitable intervals about this ring, depressions 72 are formed. For each depression there is provided a retaining wheel or roller 73 which is supported upon a rod 74 which is slidably mounted in a guide member 75. At its bottom, each rod 74 has positioned about it a spring 76 and a nut or other stop means 77. The spring tends to force the rod downwardly and, thus, to hold the roller in the depression 72.

The details of the vehicle or locomotive frame are omitted to avoid complicating the drawings. Body or housing members are indicated, particularly in Figures 1 and 2, and they comprise variously shaped and positioned member 78. The invention is not limited to any such housing or body members or details.

Several types of locomotives are indicated in Figures 9, 10, 11 and 12. As shown in Figure 9, a number of high-speed steam engines 79 are mounted on the locomotive frame. Each has a shaft 4 or 5 carrying a beveled gear 7 and meshing with the beveled gear 10 of the drive which has been described above. Suitable steam generating and other apparatus may be installed in the space 80, as desired.

As shown in Figure 10, compound steam turbines 81 are indicated diagrammatically. Mechanical reversing mechanism is indicated as at 82. The steam generating and other units necessary for the operation of this form of the invention may be installed in the space 83.

As shown in Figure 11, an internal combustion engine, preferably of the Diesel type, is indicated at 84. Its shaft 85 is connected by variable speed gears 86 to shafts 6 which carry beveled gears 7 meshing with the gear 10 on the vertical shaft 11.

As shown in Figure 12, electric motors 87 are vertically mounted and the armatures of the motors, which are not shown in detail, may be keyed directly to the vertical shafts 11 of the trucks.

The torque restraining device, which is illustrated generally in Figures 2 and 4 and in detail in Figure 5, is important for several reasons. In the drive shown, there is a tendency to swing or rotate the entire truck about the swiveling axis and, thus, to force the flanges of the driving wheels against the rails with too great power and, consequently, to cause excessive friction. The torque restraining device also tends to prevent constant swinging and swiveling of the truck with relation to the locomotive frame. The inevitable irregularities of the track tend to cause the truck to move constantly. The torque restrainer resists this movement. The wheels 73 are held in their respective depression 72 by the springs 76 with sufficient force to prevent excessive swiveling movement of the truck, which unless restrained or prevented might amount merely to a constant wobble. Even though the depressions 72 are somewhat larger than the wheels 73, the relation of the parts is such that the normal driving torque when the locomotive is being driven is not sufficient to cause the wheels 73 to ride out of the notches or depressions 72 but a greater torque, such, for example, as that which occurs when the locomotive moves onto a curved piece of track, is sufficient to cause the wheels 73 to move out of the notches or depressions 72 and, consequently, to cause positive turning of the truck with respect to the locomotive frame. The torque restrainer, thus, limits and restrains the motion under the influence of normal driving torque and permits suitable motion to occur under the influence of greater torque.

While one type of differential gear is shown to compensate for relative swiveling movement of the locomotive body and truck, it is obvious that other types of differential gears might be used. The invention is not limited to the particular form here shown. In general, whatever the swivel-compensating gear includes, it will ordinarily include at least three intermeshing elements—one connected to the drive shaft, one to the driven shaft, and a third to the truck frame. As shown, the gear 13 is connected to the truck frame, the carrier 14 for the gears 15 is connected to the drive shaft 11, and the gear 16 is connected to the driven shaft or hub 17.

I claim:

1. In combination with the main frame of a rail vehicle, a truck, driving means on the main frame and a mechanical drive from said driving means to said truck, said drive including a vertical shaft, the truck and frame being joined about the axis of the said shaft for swiveling movement with respect to each other, the drive including a differential gear including differential pinions mounted to move about the vertical shaft and connections between one of said differential gears and the truck wheels whereby the latter are rotated by movement of said differential gear, the other of said differential gears being rotatable by the swiveling movement of the truck.

2. In combination in a rail vehicle, a main frame, a propelling means mounted thereon, a carrying truck therefor having a plurality of driven axles, said truck being swiveled to said main frame about a vertical axis, a bearing having an axis common to and concentric with that of the swivel, said bearing shaped to resist tractive force and to permit the truck to swivel with respect to the main frame but holding the truck against other relative movement, and a vertical drive shaft coaxial with the axis of said swivel, a hub on said drive shaft, a plurality of pinions rotatively secured to said hub, a driving gear meshing with said pinions, a swivel-compensating reaction gear concentric with said swivel and meshing with said pinions, and means for causing the swivel-compensating gear to rotate about the drive shaft throughout the same angle of rotation described by the truck in swiveling, said rotation being in the opposite direction of the rotation of said truck.

3. In combination in a traction locomotive, a locomotive body and a plurality of supporting and driving trucks swiveled to said locomotive body, a source of power on said body, means connecting each of said trucks to said body for motion about a single axis for each truck and means on said body and on said trucks for preventing any other relative movement of the trucks with respect to the body, wheels journaled in said trucks and means for driving said wheels from said source of power, said driving means including drive shafts to said wheels and connections concentric with each swivel axis and including means for transmitting power simultaneously to all of the wheels of said trucks, there being a differential gear mechanism in each of said connections, said differential gear mechanism including a gear element moved by the swiveling movement of its truck and being positioned co-axially with said swivel axis.

4. In combination, a locomotive, and a power plant, a drive for use in transmitting power from said locomotive power plant to a wheeled truck connected to said locomotive for swiveling movement with respect thereto, said drive including a vertical shaft, means for driving said shaft from the locomotive power plant, driving connections between said shaft and the wheels of said truck, said driving connections including drive shafts to said wheels and a differential gear mechanism, said differential gear mechanism including a part moved by the swiveling motion of its truck and being positioned co-axial with the axis of said swiveling movement and ahead of said wheel drive shafts, said differential gear mechanism being co-axial with said swivel axis.

5. In combination, a locomotive, and a power plant, a drive for use in transmitting power from said locomotive power plant to a wheeled truck connected to said locomotive for swiveling movement with respect thereto and including means for holding said truck against any other movement with respect thereto, said drive including a shaft, means for driving said shaft from the locomotive power plant, driving connections between said shaft and the wheels of said truck, and shaft driving means including an epicyclic gear assembly, said epicyclic gear assembly including a gear element mounted to be positively moved by swiveling movement of its associated truck and being positioned co-axially with the axis of said swiveling movement and transmitting power from said power plant to said wheels.

6. In combination, a locomotive, and a power plant, a drive for use in transmitting power from said locomotive power plant to a wheeled truck connected to said locomotive for swiveling movement with respect thereto and including means for holding said truck against any other movement with respect thereto, said drive including a shaft, means for driving said shaft from the locomotive power plant, driving connections between said shaft and the wheels of said truck, said driving connections including drive shafts for said wheels and flexible links and said means including an epicyclic gear assembly, said epicyclic gear assembly having three main elements one being a gear element connected to its truck so as to be moved positively by it and through an angle equal and opposite to that of the movement of said truck, the two other elements of said gear assembly being connected one to the power plant and one to the wheels, all of said elements being positioned co-axial with the axis of said swiveling movement and transmitting power from said power plants to said wheel drive shafts.

7. In combination in a locomotive, a main frame, propelling means thereon, a plurality of trucks swiveled thereto, each truck including a driven axle, and a mechanical drive from the propelling means to said axle, said mechanical drive including a vertical drive shaft for each truck, each drive shaft being co-axial with the swiveling axis of its truck, and an epicyclic gear assembly upon each vertical drive shaft, each epicyclic gear assembly including an element connected to its truck and adapted to be moved by said truck through an angle equal and opposite to that through which the truck swivels, whereby swivel of the truck frame produces no fluctuation in the transmission of the torques from the drive shafts to the driven axles, beyond that imposed by the propelling means themselves.

8. In combination, a rail vehicle, a truck, driven axles on said truck, driving machinery on the main frame and mechanical driving means between said driving machinery and said driven axles, said driving means including a vertical shaft co-axial with the swivel axis around which the truck frame, while supporting the main frame, swivels with respect to the latter, the drive including a hub on a drive shaft, a set of pinions rotatively secured thereto, a drive gear, and a reaction gear, said pinions meshing with both the drive gear and the reaction gear, said reaction gear mounted to be rotatively shifted by the swiveling movement of the truck frame through an angle equal to that of the truck frame and in the opposite direction thereto, and means for accomplishing said shifting movement, which means include gear segments, one positioned on said truck frame, another carried by said vehicle and fastened to said reaction gear and pinions meshing with said gear segments and supported for rotation on said vehicle and arcuate tracks positioned concentrically with the swiveling axis, and disposed one on the truck and one on the vehicle, and rollers positioned between said tracks and engaging both, said rollers cooperating with said tracks to keep the said drive centered with the swiveling axis and adapted also to transmit tractive force to the main frame.

RUDOLF M. OSTERMANN.